March 22, 1949.   J. A. HIPPLE, JR   2,465,229
VACUUM TRAP
Filed Sept. 7, 1944
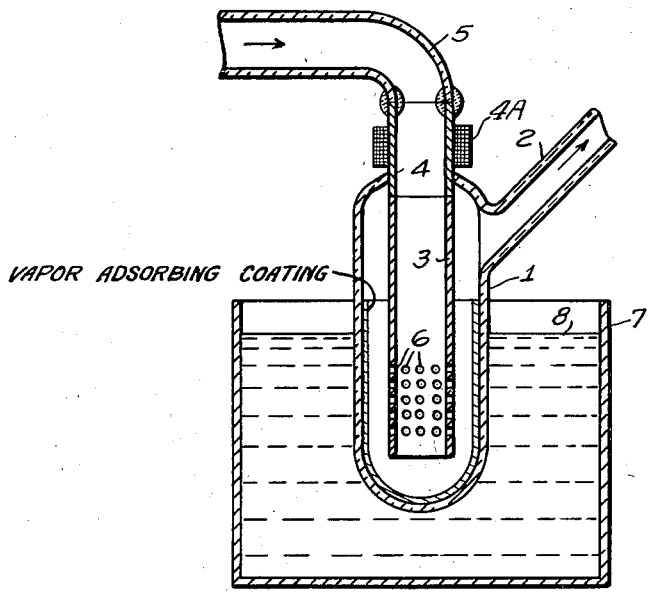
WITNESSES:
INVENTOR
John A. Hipple, Jr.
BY
ATTORNEY

Patented Mar. 22, 1949

2,465,229

UNITED STATES PATENT OFFICE 2,465,229

VACUUM TRAP

John A. Hipple, Jr., Verona, Pa., assignor to Westinghouse Electric Corporation, East Pittsburgh, Pa., a corporation of Pennsylvania Application September 7, 1944, Serial No. 553,055

9 Claims. (Cl. 183—4)

My invention relates to gas and vapor traps for vacuum systems and, in particular, relates to such traps in which vapors are to be condensed out of a stream of gas by the action of low temperature such as that in liquid air traps.

In accordance with the prior art vapors such, for example, as water vapor, mercury vapor, or oil vapors which may be present in portions of a high vacuum system are prevented from diffusing into other portions by interposing in the path of diffusion, vessels having the general outline or configuration shown in the drawings herein. Such vessels or containers comprise an outer cylindrical envelope which surrounds a reentrant tube having an opening adjacent one end of the outer envelope. An inlet passage from the portion of the system containing the vapors to be condensed conducts gases through the inner cylinder, and they flow from the open end of the latter into contact with the walls of the outer cylinder and thence through an offtake pipe to other portions of the apparatus. The outer cylinder is cooled to a low temperature by immersion in liquid air or the like.

However, I have found that for certain purposes these prior art traps have serious effects. The space between the inner and outer cylinders was ordinarily at the very high vacuum of the pumping system, and while the walls of the outer cylinder were in contact with a refrigerant at very low temperatures, the lower end of the interior cylinder was pretty effectively heat-insulated from this source of low temperature by the above-mentioned evacuated space and by the poor heat conductivity of the glass walls of the inner and outer cylinders. As a result, the lower end of the interior cylinder would be nearly at room temperature during the earlier portion of the time when the refrigerant was applied to the outer cylinder and would thereafter gradually drop in temperature until it attained nearly the low temperature of the lower part of the wall of the outer cylinder. Upon attaining this low temperature, vapors would condense upon the interior of the inner cylinder as well as on the interior wall of the outer cylinder.

It was in practice almost impossible, or at least impracticable, to maintain an entirely absolute level of refrigerant about the outer cylinder. This would permit the upper portions of the walls of the interior cylinder, which had previously obtained a low temperature, to warm up again; and, as a result, vapors condensed thereon would re-evaporate. These re-evaporated vapors would find their way into portions of the vacuum system both ahead and behind the traps.

Another difficulty from such prior art traps was the long time interval during which the temperatures of the internal cylindrical wall were changing, thereby varying the effectiveness of the trap. Diffusion of the re-evaporated vapors to other portions of the system was sometimes prevented by immersing a tube or trap containing activated carbon in liquid air. However, such an arrangement was decidedly dangerous in that contact of the carbon with the liquid air by reason of any accident was likely to produce a disastrous explosion.

One object of my invention is, accordingly, to provide a vapor trap for vacuum systems which will be of an improved type capable of minimizing the difficulties described above.

Another object of my invention is to provide a novel type of vapor trap or vacuum system which shall be relatively insensitive to variations in level of the refrigerant in which it is immersed.

Another object of my invention is to provide a vapor trap for vacuum systems which shall obtain final equilibrium conditions of operation without the long time lag characteristics of prior art traps.

Still another object of my invention is to provide a vapor trap for vacuum systems which shall avoid the dangers of explosion with the use of charcoal and liquid air.

Other objects of my invention will become apparent upon reading the following description taken in conjunction with the drawing, in which the single figure is a view in section, showing a vapor trap embodying the principles of my invention.

Referring in detail to the drawing, my vapor trap comprises an externally closed cylindrical container 1 which may, for example, be of glass having an offtake pipe 2 sealed into the upper region of its cylindrical wall. Centrally disposed in the cylinder 1 is a cylindrical pipe 3 of metal which may, for example, be copper or any other substance capable of being attached to an end ring of some metal capable of forming vacuum type seals with the glass of the cylinder 1. For example, the upper end portion 4 of the pipe 3 may comprise an alloy of substantially 18% cobalt, 28% nickel and the remainder iron, or one of the other alloys described in Scott Patent 2,062,335. As stated in this patent, such alloys are capable of forming vacuum-tight seals with boro-silicate glasses such, for example, as the Corning Glass type G705AJ. The cylindrical envelope 1 is accordingly made of such a glass and sealed vacuum tight to the alloy portion 4. To the upper end of the alloy, portion 4, is sealed a tube 5 formed of glass which may be of any type capable of forming vacuum-tight joints therewith, such, for example, as the type of glass which composes the cylindrical envelope 1. The lower end of the central tube 3 is preferably open, and the lower wall portion may be pierced by holes 6.

The structure so far described is capable of acting as a vapor trap when sealed to a vacuum system, being immersed in a container 7 for some refrigerant such as liquid air, the upper surface of which is represented at 8.

Since the metal forming the inner cylindrical pipe is a good conductor of heat, the temperature of the lower end of the pipe 3 will fall very little below that of the metal ring 4; it will, accordingly, remain very nearly at room temperature. There will, accordingly, be but very little cooling of the lower end of the pipe 3 and substantially no condensation of vapors will occur thereon during the use of the apparatus. Such vapors as are passed through pipe 3 and which are emitted from the lower end or from the holes 6 will condense upon striking the adjacent walls of the outer cylinder 1 which are maintained very close to the temperature of the liquid air or other refrigerant in which they are immersed. Nearly all such vapors will, in fact, be condensed on the lower portions of the cylindrical container 1, and, as a result, while variations in the level 8 of the refrigerant will cause variations in the temperature of the upper end of cylinder 1, this will produce very little condensation or re-evaporation of vapors. There will, accordingly, be very little alteration of the condensing effect of the trap as time passes by during the course of a practical use, since there never will be any tendency, as in the case of prior art described above, for vapor to condense and re-evaporate on the lower portions of the inner cylinder 3, and variations in the surface level 8 of the refrigerant will cause very little change in the area of the interior surface of the container on which vapor is actually condensed.

It is even possible to heat, electrically or otherwise, the upper wall portion 4 of the inner cylinder 3 which is exposed above the seal to the wall of cylinder 1 so that the temperature of the cylindrical pipe 3 is subject to very complete control. A temperature control means such as a heater 4A is shown in the drawing for this purpose.

While the arrangement so far described is very effective as a vapor trap, I have found that it is in many cases desirable to coat the interior wall of the container with some activated material, i. e., a material capable of adsorbing vapors at the temperatures of the refrigerant. The adsorbing material which I have so far found most useful in practice is silica gel. This may be applied by coating the interior wall of the container 1 with water glass and then depositing silica gel on the surface of the latter to act as an effective binder. Alternatively, I may coat the interior surface of the container 1 with activated carbon. When in the activated condition, the carbon may adhere sufficiently to the wall surface to make an additional adhesive unnecessary.

While I have described a specific embodiment of the principles of my invention in conformity with the patent statutes, it will be recognized that these principles are capable of broader application in another embodiment which will be evident to those skilled in the art.

I claim as my invention:

1. A vacuum-tight container having an outer wall portion of a material which is a poor heat conductor, a first conduit sealed vacuum-tight into said wall portion, a re-entrant conduit of good heat conducting material sealed vacuum-tight through said wall portion and a third conduit sealed vacuum-tight to the end of said re-entrant conduit which is outside said container.

2. A vacuum-tight container having an outer wall portion of a material which is a poor heat conductor, a first conduit sealed vacuum-tight into said wall portion, a re-entrant conduit of good heat conducting material sealed vacuum-tight through said wall portion and a third conduit of poor heat conducting material sealed vacuum-tight to the end of said second conduit which is outside said wall portion.

3. A vacuum-tight container having an outer envelope of glass, a conduit of glass sealed vacuum-tight to said envelope, an inner cylinder of metal sealed vacuum-tight through the wall of said envelope adjacent one end thereof and a third conduit of glass sealed to the external end of said inner cylinder.

4. A vacuum-tight container having an outer wall portion of a material which is a poor heat conductor, a first conduit sealed vacuum-tight into said wall portion, and a re-entrant conduit of good heat conducting material sealed vacuum-tight through said wall portion, a portion of the interior of said wall portion being coated with an activated substance.

5. A vacuum-tight container having an outer wall portion of a material which is a poor heat conductor, a first conduit sealed vacuum-tight into said wall portion, a re-entrant conduit of good heat conducting material sealed vacuum-tight through said wall portion and a third conduit of poor heat conducting material sealed vacuum-tight to the end of said second conduit which is outside said wall portion, a portion of the interior of said wall portion being coated with silica gel.

6. A vapor trap for vacuum systems comprising an outer container of glass closed at one end, a re-entrant cylinder of metal sealed vacuum-tight through the other end of said cylinder of glass, and a glass conduit sealed to the wall of said glass cylinder near the end thereof through which said metal cylinder is sealed.

7. A vapor trap for vacuum systems comprising an outer cylinder of glass closed at one end, a re-entrant cylinder of metal sealed vacuum-tight through the other end of said cylinder of glass, and a glass conduit sealed to the wall of said glass cylinder near the end thereof through which said metal cylinder is sealed, the interior of said glass cylinder being coated with silica gel.

8. A vapor trap for vacuum systems comprising an outer container of glass closed at one end, a re-entrant cylinder sealed vacuum-tight through the other end of said cylinder of glass, a glass conduit sealed to the wall of said glass cylinder near the end thereof through which said re-entrant cylinder is sealed, and means for supplying heat to said re-entrant cylinder.

9. A vapor trap for vacuum systems comprising an outer cylinder of glass closed at one end, a re-entrant cylinder sealed vacuum-tight through the other end of said cylinder of glass, a glass conduit sealed to the wall of said glass cylinder near the end thereof through which said re-entrant cylinder is sealed, the interior of said glass cylinder being coated with silica gel, and means for supplying heat to control the temperature of said re-entrant cylinder.

JOHN A. HIPPLE, Jr.

REFERENCES CITED

The following references are of record in the file of this patent:

UNITED STATES PATENTS

| Number | Name | Date |
| --- | --- | --- |
| 879,129 | Dewar | Feb. 11, 1908 |
| 1,307,999 | Buckley | June 24, 1919 |
| 1,454,381 | Stepp | May 8, 1923 |
| 1,535,157 | Hughes | Apr. 28, 1925 |
| 1,714,245 | Schaefer | May 21, 1929 |
| 2,246,327 | Slepian | June 17, 1941 |
| 2,317,814 | Schuchmann | Apr. 27, 1943 |